(12) United States Patent
Joo et al.

(10) Patent No.: US 10,719,132 B2
(45) Date of Patent: Jul. 21, 2020

(54) DEVICE AND METHOD OF CONTROLLING DEVICE

(71) Applicant: SAMSUNG ELECTRONICS CO., LTD., Suwon-si (KR)

(72) Inventors: Yu-sung Joo, Yongin-si (KR); Yo-han Kim, Suwon-si (KR); Sung-uk Ryu, Suwon-si (KR); Jae-jun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

(21) Appl. No.: 14/744,440

(22) Filed: Jun. 19, 2015

(65) Prior Publication Data

US 2015/0370334 A1 Dec. 24, 2015

Related U.S. Application Data

(60) Provisional application No. 62/014,392, filed on Jun. 19, 2014.

(30) Foreign Application Priority Data

Jan. 28, 2015 (KR) .......................... 10-2015-0013550

(51) Int. Cl.
| | |
|---|---|
| G06F 3/01 | (2006.01) |
| G06F 3/0488 | (2013.01) |
| G06F 3/0484 | (2013.01) |

(52) U.S. Cl.
CPC .......... *G06F 3/017* (2013.01); *G06F 3/04842* (2013.01); *G06F 3/04883* (2013.01); *G06F 2203/04806* (2013.01); *G06F 2203/04807* (2013.01)

(58) Field of Classification Search
CPC .. G06F 3/017; G06F 3/04842; G06F 3/04883; G06F 2203/04806; G06F 2203/04807
See application file for complete search history.

(56) References Cited

U.S. PATENT DOCUMENTS

| | | | | |
|---|---|---|---|---|
| 8,952,972 | B2 * | 2/2015 | Yamamoto | G06F 3/04883 345/522 |
| 9,041,653 | B2 * | 5/2015 | Chen | G06F 3/0416 345/168 |
| 9,223,471 | B2 * | 12/2015 | Buxton | G06F 3/0482 |
| 9,262,067 | B1 * | 2/2016 | Bell | G06F 3/0488 |
| 9,268,407 | B1 * | 2/2016 | Noble | G06F 3/0488 |
| 9,665,206 | B1 * | 5/2017 | Missig | G06F 3/0416 |
| 9,791,963 | B2 * | 10/2017 | Cho | G06F 3/0488 |
| 9,965,168 | B2 * | 5/2018 | Eom | G06F 3/0481 |
| 10,303,266 | B2 * | 5/2019 | Roziere | G06F 3/0482 |
| 2006/0184966 | A1 * | 8/2006 | Hunleth | G06F 3/017 725/39 |
| 2007/0143663 | A1 | 6/2007 | Hansen et al. | |

(Continued)

*Primary Examiner* — Jose R Soto Lopez
(74) *Attorney, Agent, or Firm* — Sughrue Mion, PLLC

(57) ABSTRACT

Provided are a device and a method of controlling the device. The method includes obtaining information regarding type of a hovering input unit configured to transmit a hovering input to the device; and displaying a user interface corresponding to the obtained information regarding type of the hovering input unit from among a plurality of user interfaces related to an application executed on the device.

17 Claims, 16 Drawing Sheets

(56) References Cited

U.S. PATENT DOCUMENTS

| | | | |
|---|---|---|---|
| 2011/0012856 A1* | 1/2011 | Maxwell | G06F 3/018 345/173 |
| 2011/0258527 A1 | 10/2011 | Woolf et al. | |
| 2012/0068941 A1* | 3/2012 | Arrasvuori | G06F 3/04883 345/173 |
| 2012/0306927 A1* | 12/2012 | Lee | G06F 3/041 345/660 |
| 2013/0241827 A1* | 9/2013 | Ronkainen | G06F 3/0488 345/157 |
| 2014/0189556 A1* | 7/2014 | Soo | G06F 3/0416 715/765 |
| 2014/0331146 A1* | 11/2014 | Ronkainen | G06F 3/0482 715/741 |
| 2014/0344753 A1* | 11/2014 | Akasaka | G06F 3/04842 715/823 |
| 2014/0354554 A1* | 12/2014 | Devi | G06F 3/0488 345/173 |
| 2014/0362119 A1* | 12/2014 | Freund | G06F 3/04883 345/661 |
| 2014/0368421 A1* | 12/2014 | Smus | G06F 3/038 345/156 |
| 2014/0368442 A1* | 12/2014 | Vahtola | G06F 3/013 345/173 |
| 2015/0002405 A1* | 1/2015 | Kuan | G06F 3/041 345/173 |
| 2015/0052481 A1* | 2/2015 | Ronkainen | G06F 3/0416 715/815 |
| 2015/0058772 A1* | 2/2015 | Bator | G06T 11/206 715/769 |
| 2015/0067613 A1* | 3/2015 | Kim | G04G 13/023 715/863 |
| 2015/0077338 A1* | 3/2015 | Dai | G06F 3/0488 345/157 |
| 2015/0077345 A1* | 3/2015 | Hwang | G06F 3/0412 345/173 |
| 2015/0160778 A1* | 6/2015 | Kim | G06F 3/044 345/174 |
| 2015/0177903 A1* | 6/2015 | Kim | G06F 3/03545 345/156 |
| 2015/0193040 A1* | 7/2015 | Hwang | G06F 3/042 345/157 |
| 2015/0199030 A1* | 7/2015 | Mikkola | G06F 3/0489 345/157 |
| 2015/0253923 A1* | 9/2015 | Cho | G06F 3/0488 345/173 |
| 2015/0253925 A1* | 9/2015 | Nakao | G06F 3/04883 345/173 |
| 2015/0324068 A1* | 11/2015 | Bellare | G06F 3/0482 715/763 |
| 2016/0293114 A1* | 10/2016 | Hayashi | G09G 3/3607 |
| 2017/0075457 A1* | 3/2017 | Hayashi | G06F 3/041 |
| 2017/0199750 A1* | 7/2017 | Reuschel | G06F 9/452 |

* cited by examiner (a)   (b)

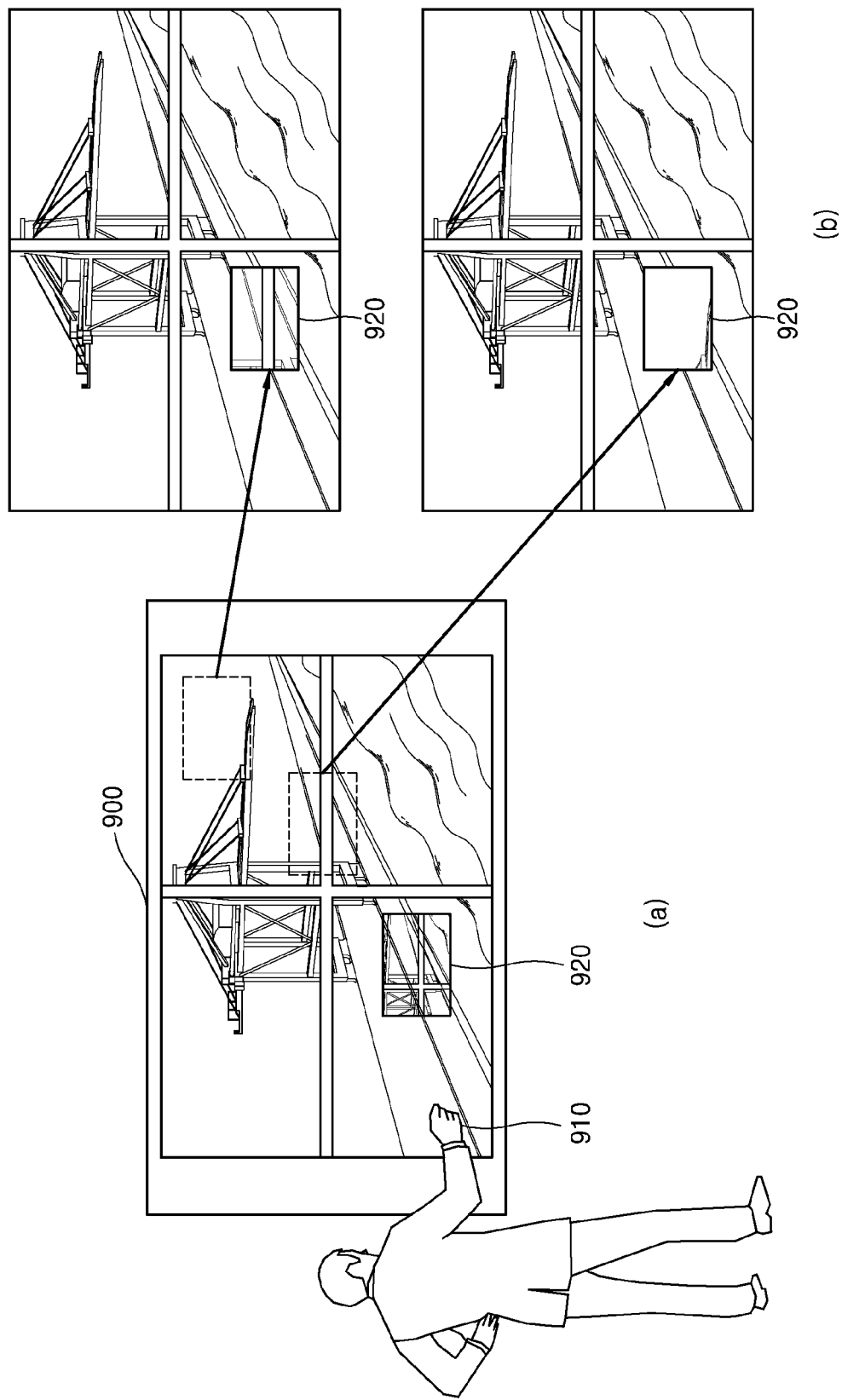

FIG. 13
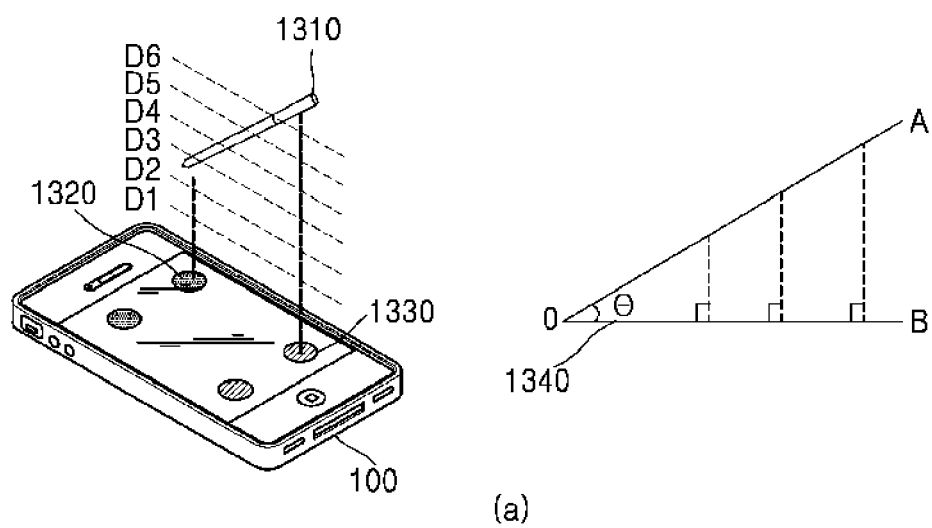
(a)
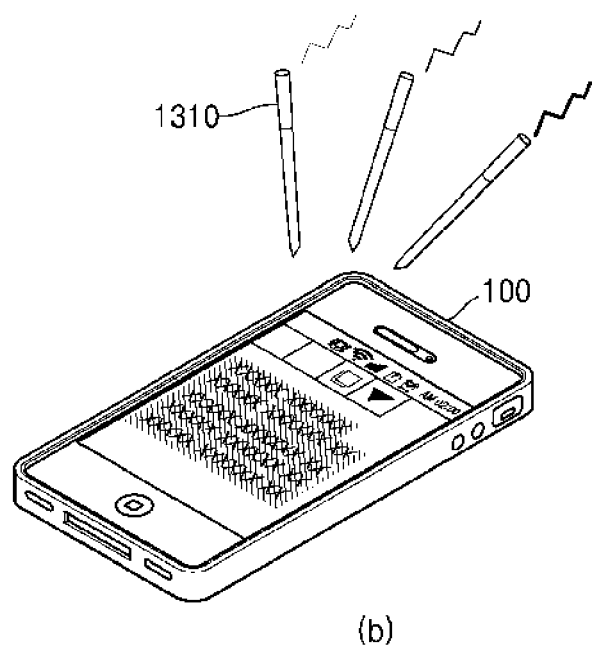
(b)

DEVICE AND METHOD OF CONTROLLING DEVICE

CROSS-REFERENCE TO RELATED APPLICATIONS

This application claims the benefit of U.S. Provisional Application No. 62/014,392, filed on Jun. 19, 2014, in the US Patent Office and Korean Patent Application No. 10-2015-0013550, filed on Jan. 28, 2015, in the Korean Intellectual Property Office, the disclosures of which are incorporated herein in their entireties by reference.

BACKGROUND

1. Field

Methods and apparatuses consistent with exemplary embodiments relate to controlling a device.

2. Description of the Related Art

With development in network and multimedia technologies, a user of a device may receive various services from service providing servers. Furthermore, as researches are actively made on devices along with developments in network and multimedia technologies, devices may provide various forms of user interfaces to users.

Since devices provide various services and various user interfaces, a user may use user inputs in various forms to control a device for receiving desired services. As devices include various types of sensors, a technique for controlling a device by recognizing user inputs in various forms to provide input interfaces suitable for user-accessible services has recently been introduced.

SUMMARY

One or more exemplary embodiments include methods of providing user interfaces based on a user input unit configured to transmit information to a device for a user to easily access services provided by the device Additional aspects will be set forth in part in the description which follows and, in part, will be apparent from the description, or may be learned by practice of the exemplary embodiments.

According to an aspect of an exemplary embodiment, there is provided a method of controlling a device, the method including: obtaining information regarding a type of a hovering input unit configured to transmit a hovering input to the device; and displaying a user interface corresponding to the obtained information from among a plurality of user interfaces related to an application to be executed on the device.

The displaying of the user interface may include determining a selection accuracy indicating an accuracy in which the hovering input unit recognizes information regarding different operations, based on the type of the hovering input unit; and displaying, based on the determined selection accuracy, a user interface in which information regarding at least one operation to be performed in the application is displayed.

The displaying of the user interface may include displaying a user interface of which locations to output information regarding performable operations during an execution of an application are different according to the determined selection accuracy.

The displaying of the user interface may include, if the determined selection accuracy is equal to or greater than a predetermined value, displaying a user interface in which the information regarding the at least one operation is displayed based on a distance between the hovering input unit and the device.

The displaying of the user interface may include determining a unit of performing a selected operation during an execution of the application based on the type of the hovering input unit; and displaying a user interface, in which information regarding the operation is displayed based on the determined unit of performing the operation, from among the plurality of user interfaces.

The plurality of user interfaces may include a user interface in which operations to be performed during an execution of the application are categorized based on selection accuracies of hovering input units for performing the respective operations.

The displaying of the user interface may include, in response to executing the application, primarily displaying a user interface in which information regarding operations corresponding to the type of the hovering input unit is displayed.

The displaying of the user interface may include, if hovering inputs do not correspond to respective operations to be performed during an execution of the application, displaying a user interface displaying information regarding a plurality of operations that are categorized into groups.

The plurality of operations are categorized into groups based on at least one of the number of times that each of the respective operations is performed during a preset time period and relationships between the operations.

The method further includes obtaining location information regarding a first surface and a second surface of the hovering input unit; determining an angle between the hovering input unit and the device by using the obtained location information; and determining an operation to be performed during an execution of the application based on the determined angle.

According to an aspect of another exemplary embodiment, there is provided a device including: a sensor configured to obtain information regarding a hovering input unit transmitting a hovering input to the device; a controller configured to control displaying a user interface corresponding to the obtained information from among a plurality of user interfaces related to an application to be executed on the device; and a display configured to display the corresponding user interface.

The controller may determine a selection accuracy indicating a precision of the hovering input unit for recognizing information regarding different operations, based on the type of the hovering input unit, and select, based on the determined selection accuracy, a user interface in which information regarding at least one operation to be performed in the application is displayed.

The controller may select a user interface of which locations to output information regarding performable operations during an execution of an application are different according to the determined selection accuracy.

If the determined selection accuracy is equal to or greater than a predetermined value, the controller may select a user interface in which the information regarding the at least one operation is displayed based on a distance between the hovering input unit and the device.

The controller may determine a unit of performing a selected operation during an execution of the application based on the type of the hovering input unit, and select a user interface, in which information regarding the operation is displayed based on the determined unit of performing the operation, from among the plurality of user interfaces.

The plurality of user interfaces may include a user interface in which operations to be performed during an execution of the application are categorized based on selection accuracies of hovering input units for performing the respective operations.

In response to executing the application, the controller may primarily select a user interface in which information regarding operations corresponding to the type of the hovering input unit is displayed.

If hovering inputs do not correspond to respective operations to be performed during an execution of the application, the controller may select a user interface displaying information regarding a plurality of operations that are categorized into groups.

The plurality of operations are categorized into groups based on at least one of numbers of times that the respective operations are performed during a preset time period and relationships between the operations.

The sensor may obtain location information regarding a first surface and a second surface of the hovering input unit, and the controller may determine an angle between the hovering input unit and the device by using the obtained location information and determine an operation to be performed during an execution of the application based on the determined angle.

BRIEF DESCRIPTION OF THE DRAWINGS

These and/or other aspects will become apparent and more readily appreciated from the following description of the exemplary embodiments, taken in conjunction with the accompanying drawings, in which:

FIG. 9 is a diagram for describing a method of changing a user interface based on a hovering input detected by a device including a large display unit, according to an exemplary embodiment;

FIG. 13 is a diagram for describing a method of determining an operation to be performed during execution of an application based on a tilting angle of a hovering input unit with respect to a device, according to an exemplary embodiment;

DETAILED DESCRIPTION OF EXEMPLARY EMBODIMENTS

Figure 1:
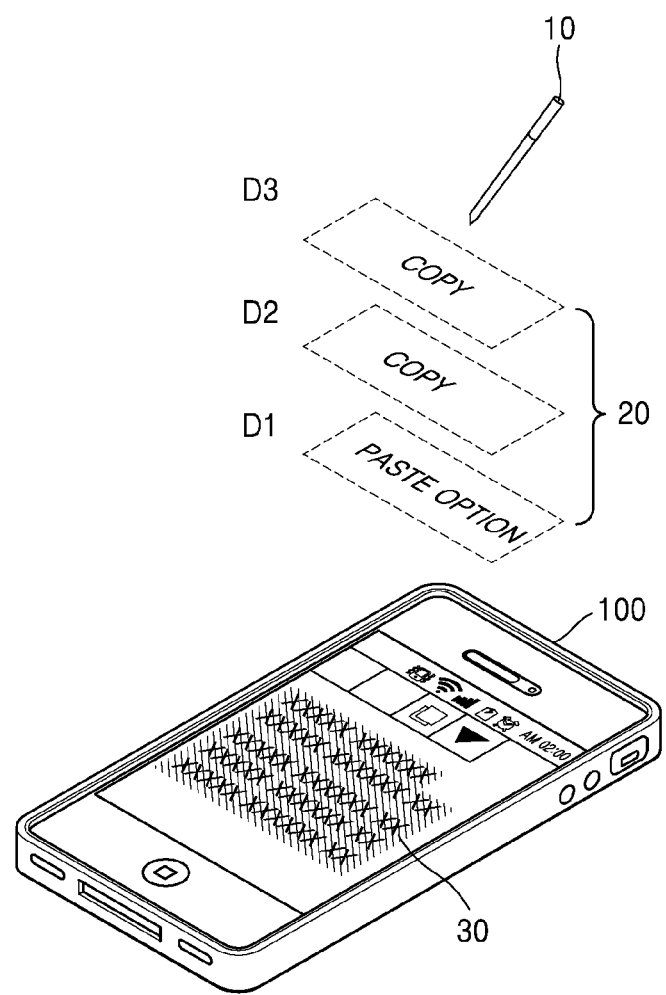
FIG. 1 is a diagram for describing a method of controlling a device, according to an exemplary embodiment.

Reference will now be made in detail to exemplary embodiments, which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Also, well-known functions or constructions are not described in detail since they would obscure the exemplary embodiments with unnecessary detail.

It will be understood that when an element is referred to as being "connected to" another element, it can be directly or electrically connected to the other element, or intervening elements may be present. It will be further understood that the terms "comprises" and/or "comprising" used herein specify the presence of stated features or components, but do not preclude the presence or addition of one or more other features or components.

Throughout the present specification, the term application refers to a set of a series of computer programs for performing a particular task. The inventive concept may include various applications. For example, applications may include a music player application, a movie player application, a picture folder application, a camera application, a document editing application, a memo application, a diary application, a phone book application, a broadcasting application, a fitness aid application, and a payment application, but are not limited thereto.

Meanwhile, throughout the present specification, a hovering input may be generated when a hovering input unit is located within a predetermined distance from a device. The hovering input generated as the hovering input unit approaches to the device may be changed based on at least one of a distance between the device and the hovering input unit, a motion of the hovering input unit, and a type of the hovering input unit. Various methods may be used to detect a hovering input generated by a hovering input unit.

According to an exemplary embodiment, if a hovering input unit approaches to a device, a voltage flow formed in a panel of the device may be changed. As the voltage flow formed in the device is changed, a signal may be generated. The device may recognize coordinates of the approaching hovering input unit based on the generated signal. Here, the term coordinates may include coordinates on a 2-dimensional plane and coordinates in a 3-dimensional space.

According to another exemplary embodiment, a device may recognize coordinates of an approaching hovering input unit by recognizing a signal changed by a static electricity generated by the hovering input unit.

According to another exemplary embodiment, a device may recognize coordinates of an approaching hovering input unit by detecting a phenomenon that a light is blocked by the hovering input unit.

According to another exemplary embodiment, a device may recognize coordinates of an approaching hovering input unit by detecting a magnetic field that is changed as the hovering input unit approaches.

According to another exemplary embodiment, a device may detect ultrasound waves of particular frequencies generated by a hovering input unit. The device may recognize coordinates of an approaching hovering input unit based on locations at which ultrasound waves are detected. However, the above-stated methods that the device detects a hovering input unit are merely examples, and a general proximity sensing technique for contactlessly detecting an input device may be used as the device to detect a hovering input unit.

A type of a hovering input unit may be determined based on a kind and performance of the hovering input unit. Hovering input units may include a pen and a finger. However, they are merely examples, and hovering input units of the inventive concept are not limited thereto.

FIG. 1 is a diagram for describing a method of controlling a device 100 according to an exemplary embodiment.

The device 100 may display a user interface displaying information regarding at least one operation that may be performed by an application executed thereon. Here, the information regarding at least one operation may include an icon 20 indicating an operation and content 30 including images, texts, and moving pictures displayed on a display screen of the device 100 as the operation is executed.

Referring to FIG. 1, if a document editing application is executed on the device 100, the icons 20 respectively indicating an operation for copying a text constituting a document, an operation for cutting out a text, and an operation for pasting a text may be displayed on a user interface. Although FIG. 1 shows that the icons 20 indicating operations are displayed in a 3-dimensional space apart from the device 100, it is merely an example, and the icons 20 indicating operations may be displayed on a display screen of the device 100. Meanwhile, as an operation for copying a text is performed at the device 100, a selected text 30 may be displayed on a user interface.

The device 100 may store a plurality of user interfaces related to applications to be executed thereon. Locations of hovering inputs that need to be input to select information regarding operations may differ based on user interface.

For example, if a first user interface is displayed and a hovering input unit 10 is located at a location that is a particular distance D1, D2, or D3 apart from the device 100, the device 100 may select an operation corresponding to the location of the hovering input unit 10. According to another exemplary embodiment, if a second user interface is displayed, the device 100 may select a corresponding operation based on a location of the hovering input unit 10 on a 2-dimensional plane and a distance between the hovering input unit 10 and the device 100. However, the above-stated user interfaces are merely examples of a plurality of user interfaces according to an exemplary embodiment, and user interfaces of the inventive concept are not limited thereto.

In a plurality of user interfaces according to an exemplary embodiment, information regarding operations that may be performed during execution of an application may be displayed at different locations.

Meanwhile, the device 100 may select one from among a plurality of user interfaces based on a type of the hovering input unit 10. A type of the hovering input unit 10 may be determined based on a kind and a performance of the hovering input unit 10. The kind of the hovering input unit may include a pen and a finger.

The performance of the hovering input unit may be determined based on an accuracy in which the hovering input unit recognizes each piece of different information displayed on a user interface and maps a hovering input unit to desired information.

For example, comparing a finger to a pen, selection accuracies thereof may differ due to a difference between thickness of the finger and the pen. For example, a finger is unable to recognize each of information arranged on the device 100 at the interval of 2 mm and is unable to map a hovering input unit to desired information. However, a pen may recognize each of information arranged on the device 100 at the interval of 2 mm and may map a hovering input unit to desired information. Throughout the present specification, it will be assumed that a selection accuracy of a hovering input unit is sufficient to recognize each of different information on a user interface. In the above-stated example, it may be considered that a selection accuracy of the pen is higher than that of the finger.

The device 100 according to an exemplary embodiment may select a user interface of which locations to output information regarding operations correspond to selection accuracy of the determined hovering input unit 10 from among a plurality of user interfaces. For example, if the device 100 determines that the hovering input unit 10 is a finger, the device 100 may select a user interface in which information regarding an operation is displayed at an interval greater than 2 mm.

According to another exemplary embodiment, the device 100 may store a plurality of user interfaces corresponding to a unit for performing a selected operation during an execution of an application. For example, if a movie player application is executed, a user interface in which the size of a frame browsing unit is 10% the combined size of all frames and a user interface in which the size of a frame browsing unit is 1% the combined size of all frames may be stored in the device 100.

The device 100 may select one from among a plurality of user interfaces that output information based on a browsing unit according to the obtained type of the hovering input unit 10. For example, in the case of a finger with relatively low selection accuracy, the device 100 may select a user interface of which a frame browsing unit is 10% the combined size of all frames. In the case of a pen with relatively high selection accuracy, the device 100 may select a user interface of which a frame browsing unit is 1% the combined size of all frames.

The device 100 may be a smart phone, a mobile phone, a personal digital assistant (PDA), a laptop PC, a media player, a global positioning system (GPS) device, a wearable device, such as a smart watch and a smart glass, and any of other mobile or non-mobile computing devices, but is not limited thereto.

Figure 2:
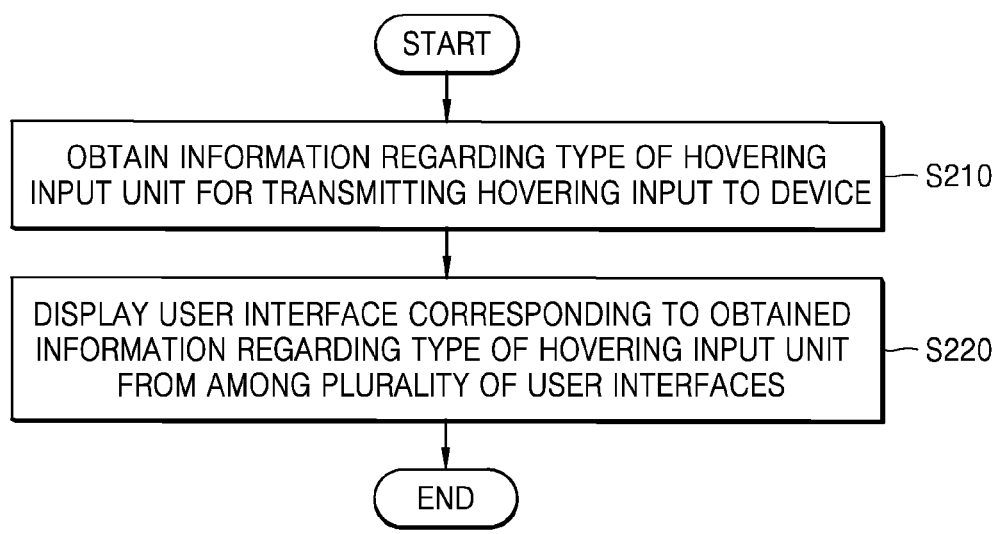
FIG. 2 is a flowchart showing a method of controlling a device, according to an exemplary embodiment.

FIG. 2 is a flowchart showing a method of controlling the device 100 according to an exemplary embodiment.

In an operation S210, the device 100 may obtain information regarding a type of the hovering input unit 10 that transmits a hovering input to the device 100.

The device 100 according to an exemplary embodiment may determine a type of the hovering input unit 10 based on a change in capacitance that results as the hovering input unit 10 is detected. The device 100 may determine the type of the detected hovering input unit 10 by comparing information regarding changed capacitance based on type of hovering input unit that is stored in advance to capacitance changed due to detection of the hovering input unit 10.

In another exemplary example, the device 100 may recognize a signal transmitted from the hovering input unit 10 and determine a type of the hovering input unit 10. In another exemplary example, the device 100 may detect a shape of the hovering input unit 10 and determine a type of the hovering input unit 10.

In an operation S220, the device 100 may display a user interface corresponding to information regarding obtained type of a hovering input unit from among a plurality of user interfaces related to an application executed on the device 100.

The device 100 may store a plurality of user interfaces related to an application executed thereon. Locations of hovering inputs for selecting one of information regarding a plurality of operations in the plurality of user interfaces may be different from one another.

For example, if a movie player application is executed, related operations may include an operation for playing back a movie, an operation for stopping playback of a movie, an operation for rewinding a movie, and an operation for fast-forwarding a movie. In a first user interface from among a plurality of user interfaces related to the movie player application, if the hovering input unit 10 is located at a location that is a particular distance D1, D2, or D3 apart from the device 100, an operation corresponding to the location of the hovering input unit 10 may be selected. In another exemplary example, in a second user interface from among the plurality of user interfaces related to the movie player application, if the hovering input unit 10 is located at a location that is a particular distance D1, D3, D5, and D7 apart from the device 100, an operation corresponding to the location of the hovering input unit 10 may be selected.

The device 100 may select one from among a plurality of user interfaces based on performance of the hovering input unit 10. Performance of the hovering input unit 10 may vary according to types of the device 100. Performance of the hovering input unit 10 may be determined based on a selection accuracy of the hovering input unit 10 for recognizing each of different information displayed on a user interface and mapping a hovering input to desired information.

In another exemplary example, the device 100 may store a plurality of user interfaces corresponding to units for performing selected operations during an execution of an application. For example, in the case of executing a movie player application, a user interface in which the size of a frame browsing unit is 10% the combined size of all frames and a user interface in which the size of a frame browsing unit is 1% the combined size of all frames may be stored in the device 100.

The device 100 may select one from among a plurality of user interfaces for outputting information by a unit for performing an operation based on obtained type of the hovering input unit 10. Detailed descriptions thereof will be given below with reference to FIGS. 7 through 9.

The device 100 may select an operation corresponding to a received hovering input on a displayed user interface. For example, the device 100 may select a cut operating based on a user interface transmitted by the hovering input unit 10 being held at a location D2 on a selected user interface.

In another exemplary example, the device 100 may display a user interface that displays information by a unit for performing an operation. For example, in the case of a movie player application, the device 100 may display a user interface, in which a unit for fast-forwarding a movie corresponds to 10% the combined size of all frames, on a display screen of the device 100.

Figure 3:
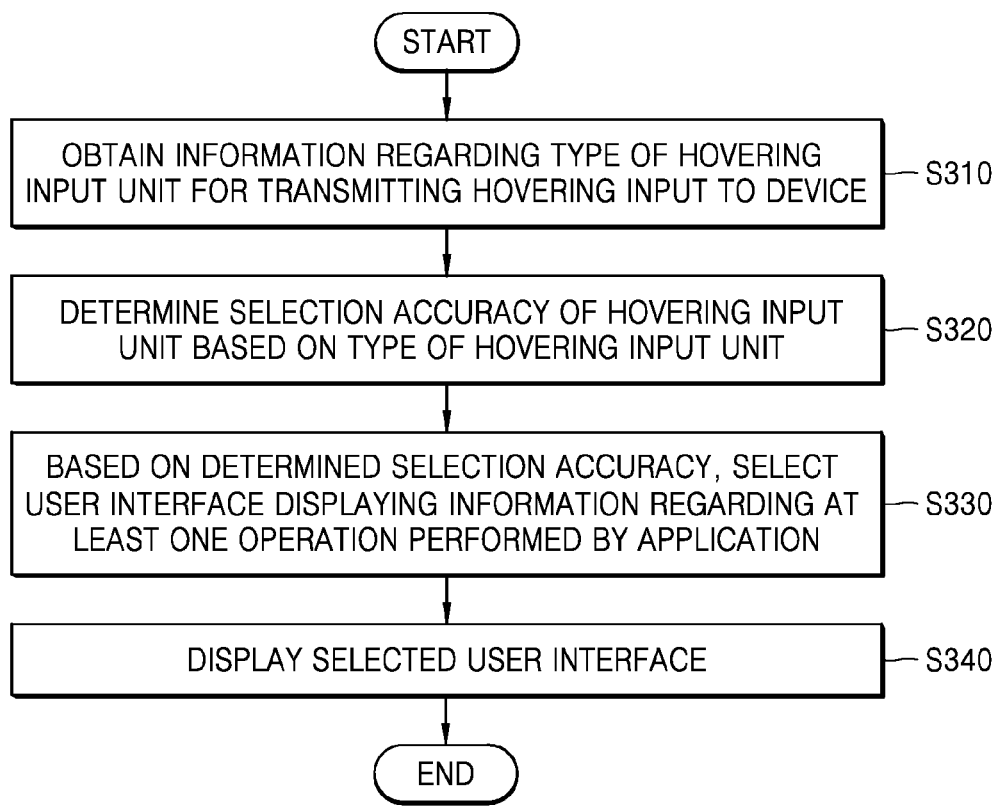
FIG. 3 is a flowchart for describing a method of selecting a user interface based on input selection accuracy of a device, according to an exemplary embodiment.

FIG. 3 is a flowchart for describing a method of selecting a user interface based on a selection accuracy of the device 100, according to an exemplary embodiment.

In an operation S310, the device 100 may obtain information regarding a type of the hovering input unit 10 transmitting a hovering input to the device 100.

Here, the operation S310 may correspond to the operation S210 described above with reference to FIG. 2.

In an operation S320, the device 100 may determine a selection accuracy of the hovering input unit 10 based on a type of the hovering input unit 10. The selection accuracy may be determined based on a distance between locations of information for the hovering input unit 10 to recognize each of different information displayed on a user interface.

For example, although a finger is unable to recognize each of information located at the interval of 2 mm and to map a hovering input to desired information, a pen is capable of recognizing each of information located at the interval of 2 mm and mapping a hovering input to desired information. According to the above-stated exemplary embodiments, a selection accuracy of a pen is higher than that of a finger.

In an operation S330, the device 100 may select a user interface on which information regarding at least one operation performed by an application is displayed based on determined selection accuracy.

A plurality of user interfaces displayed by the device 100 may have different locations for selecting information regarding respective operations. For example, in the case of a first user interface, a distance between locations for recognizing respective information regarding different operations and receiving hovering inputs to select a particular operation may be 2 mm. Meanwhile, in the case of a second user interface, a distance between locations for recognizing respective information regarding different operations and receiving hovering inputs to select a particular operation may be 3 mm.

If a selection accuracy of the hovering input unit 10 is insufficient to recognize information regarding operations that are displayed at the interval of 2 mm, the device 100 may select a user interface in which information regarding operations is displayed at the interval of 3 mm. For example, if a hovering input unit is a finger, the device 100 may select a user interface in which information regarding operations is displayed at the interval of 3 mm based on a selection accuracy of the finger.

If a selection accuracy of the hovering input unit 10 is insufficient and hovering inputs that may be received from the hovering input unit 10 do not correspond to respective information regarding operations, the device 100 may select a user interface in which multiple pieces of information regarding a plurality of operations are displayed. Here, the multiple pieces of information regarding operations may be categorized into two or more groups based on at least one of numbers of times that operations have been executed during a preset time period and relationships between the operations.

If a selection accuracy of the hovering input unit 10 is equal to or greater than a critical value, the device 100 may select a user interface in which information regarding operations is displayed based on a distance between the hovering input unit 10 and the device 100. If the selection accuracy of the hovering input unit 10 is lower than a critical value, the device 100 may select a user interface in which information regarding operations is displayed based on a distance between the hovering input unit 10 and the device 100 and information regarding a location of the hovering input unit 10 on a 2-dimensional plane. Detailed descriptions thereof will be given below with reference to FIG. 4.

In an operation S340, the device 100 may display a selected user interface. The device 100 may select an operation corresponding to a received hovering input on the displayed user interface.

Here, the operation S340 may correspond to the operation S230 described above with reference to FIG. 2.

Figure 4:
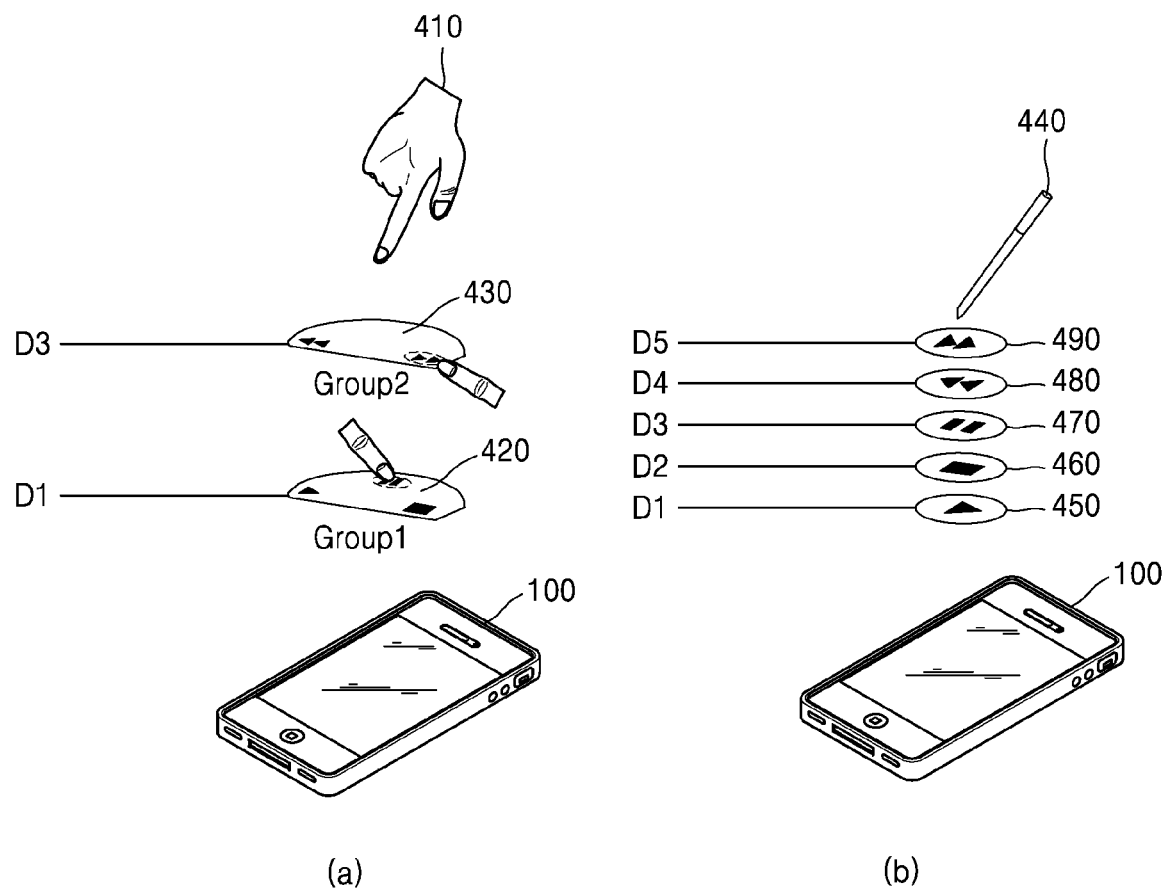
FIG. 4 is a diagram for describing a plurality of user interfaces, according to an exemplary embodiment.

FIG. 4 is a diagram for describing a plurality of user interfaces according to an exemplary embodiment.

Referring to (a) of FIG. 4, the device 100 may receive a hovering input from a finger 410. The device 100 may determine a selection accuracy of the finger 410 as a hovering input unit. For example, the device 100 may obtain information regarding a selection accuracy of the finger 410 from data stored in advance.

Based on the selection accuracy of the finger 410, the device 100 may select a user interface in which hovering inputs received from the finger 410 may be respectively mapped to desired information. Here, it is assumed that the selection accuracy of the finger 410 is lower than a critical value set to the device 100 in advance.

Since the selection accuracy of the finger 410 is lower than the critical value in (a) of FIG. 4, the device 100 may display a user interface in which one of information regarding operations that may be performed during an execution of an application based on a distance between the device 100 and a hovering input unit and information regarding location of the hovering input unit on a 2-dimensional plane.

If a distance between the device 100 and the finger 410 is D1, the device 100 may select one from among an operation for playing back a movie, an operation for stopping playback of a movie, and an operation for pausing playback of a movie that are included in a first group 420. The device 100 may select one from among the operation for playing back a movie, the operation for stopping playback of a movie, and the operation for pausing playback of a movie based on information regarding location of the finger 410 on a 2-dimensional plane. For example, if coordinates of the finger 410 on a 2-dimensional plane is (x1, y1), the device 100 may select the operation for playing back a movie, which is the operation corresponding to the location of the finger 410 at the coordinates (x1, y1).

If a distance between the device 100 and the finger 410 is D3, the device 100 may select one from between an operation for rewinding a movie and an operation for fast-forwarding a movie that are included in a second group 430. The device 100 may select one from between the operation for rewinding a movie and the operation for fast-forwarding a movie based on information regarding location of the finger 410 on a 2-dimensional plane.

Meanwhile, the device 100 may categorize operations into groups based on numbers of times that the respective operations are performed during a preset time period and relationship between the operations. For example, the device 100 may categorize operations that are performed a large number of times into a same group. Furthermore, from among operations related to playback of a movie, the device 100 may categorize a rewinding operation and a fast-forwarding operation, which are operations for changing a start frame of a movie being played back, into a same group.

Referring to (b) of FIG. 4, the device 100 may receive a hovering input from a pen 440. The device 100 may determine a selection accuracy of the pen 440 as a hovering input unit. For example, the device 100 may obtain information regarding a selection accuracy of the pen 440 from data stored in advance.

The device 100 may select a user interface in which hovering inputs received from the pen 440 may be respectively mapped to information regarding desired operations. Here, it is assumed that a selection accuracy of the pen 440 is equal to or greater than a critical value set to the device 100 in advance.

In (b) of FIG. 4, since a selection accuracy of the pen 440 is equal to or greater than the critical value, the device 100 may display a user interface in which one of information regarding operations that may be performed during an execution of an application based on a distance between the device 100 and a hovering input unit.

If a distance between the device 100 and the pen 440 is D1, the device 100 may select an operation for playing back a movie. If a distance between the device 100 and the pen 440 is D2, the device 100 may select an operation for stopping playback of a movie. If a distance between the device 100 and the pen 440 is D3, the device 100 may select an operation for pausing playback of a movie. If distances between the device 100 and the pen 440 are D4 and D5, the device 100 may select an operation for rewinding a movie and an operation for fast-forwarding a movie, respectively.

Figure 5:
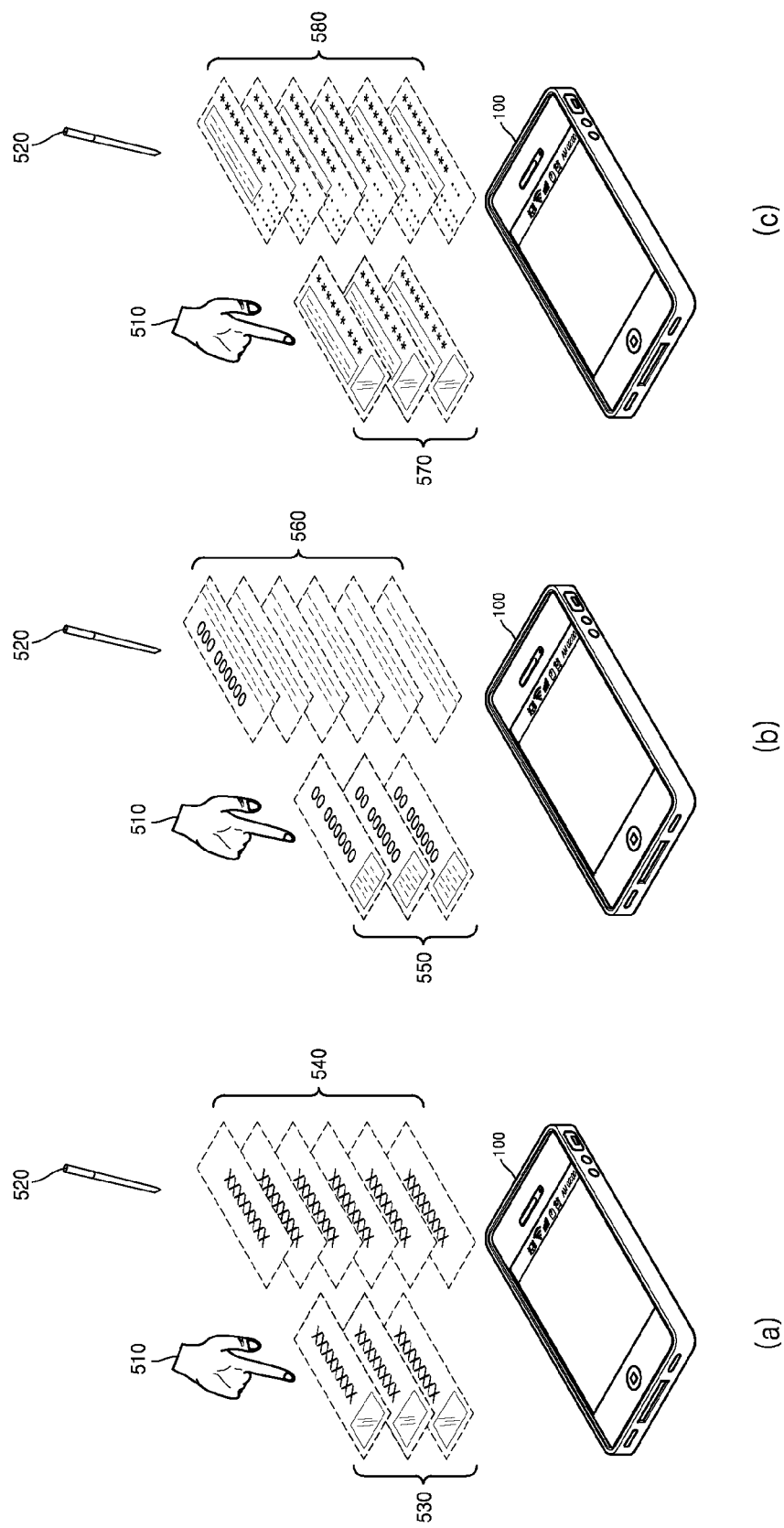
FIG. 5 is a diagram for describing a method that a device displays information regarding operations displayed on a user interface based on types of hovering input units, according to an exemplary embodiment.

FIG. 5 is a diagram for describing a method that the device 100 displays information regarding operations displayed on a user interface based on a type of hovering input units 510 and 520, according to an exemplary embodiment.

The device 100 may categorize operations that are performed during an execution of an application based on a selection accuracy of hovering input units for performing the respective operations. For example, the device 100 may categorize operations requiring high selection accuracies into a group and generate a first user interface in which information regarding the categorized operations is displayed. The device 100 may categorize operations requiring low selection accuracies into a group and generate a second user interface in which information regarding the categorized operations is displayed.

Referring to (a) of FIG. 5, the device 100 may display different user interfaces that are displayed based on a type of the hovering input units 510 and 520 in the case of executing a phone application. If the device 100 receives a hovering input from a finger 510 during an execution of the phone application, the device 100 may display a user interface 530 in which a list of missed calls from among information regarding operations related to the phone application is displayed. If the device 100 receives a hovering input from a pen 520 during an execution of the phone application, the device 100 may display a user interface 540 in which a list of contact information stored in the device 100 is displayed.

Referring to (b) of FIG. 5, the device 100 may display different user interfaces that are displayed based on a type of the hovering input units 510 and 520 in the case of executing a mail application. If the device 100 receives a hovering input from the finger 510 during an execution of the mail application, the device 100 may display a user interface 550 in which a list of unread mails from among information regarding operations related to the mail application is displayed. If the device 100 receives a hovering input from the pen 520 during an execution of the mail application, the device 100 may display a user interface 560 in which a list of mails received for a particular time period from among information regarding operations related to the mail application is displayed.

Referring to (c) of FIG. 5, the device 100 may display different user interfaces that are displayed based on a type of the hovering input units 510 and 520 in the case of executing a web application. If the device 100 receives a hovering input from the finger 510 during an execution of the web application, the device 100 may display a user interface 570 in which a list of web sites visited by a user from among information regarding operations related to the web application is displayed. If the device 100 receives a hovering input from the pen 520 during an execution of the web application, the device 100 may display a user interface 580 in which a list of favorite web sites from among information regarding operations related to the web application is displayed.

Figure 6:
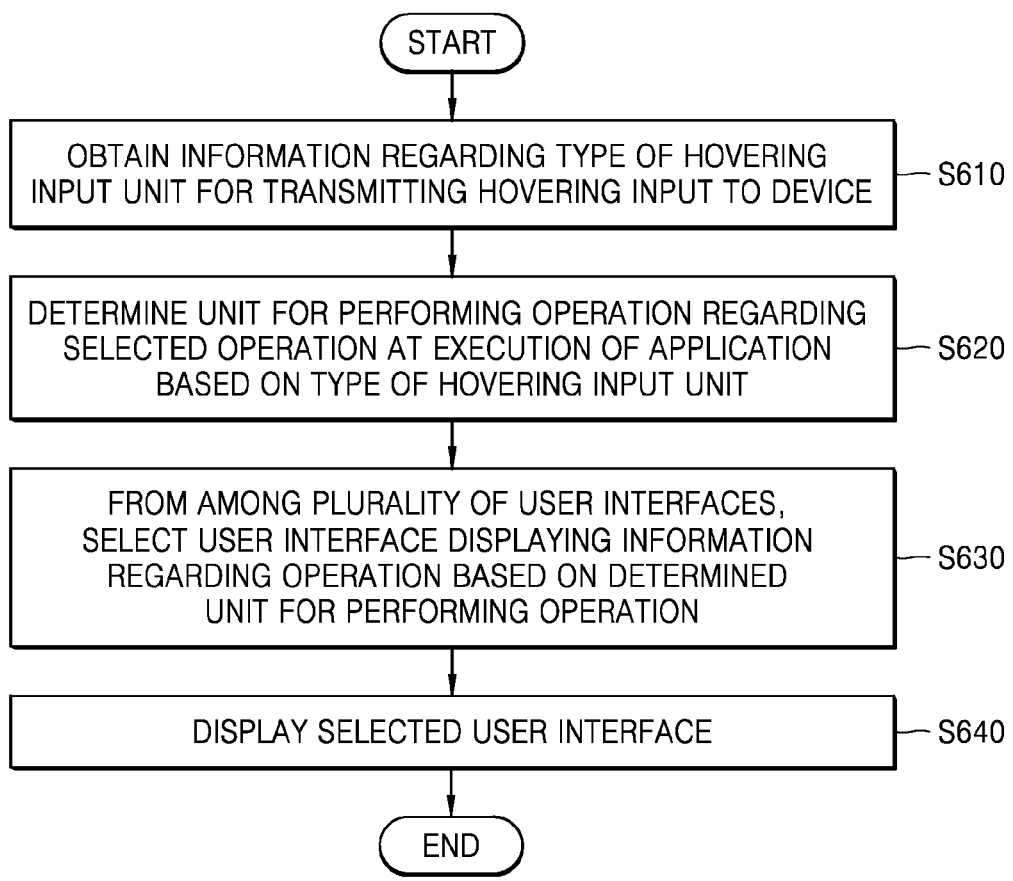
FIG. 6 is a flowchart for describing a method in which a device displays a user interface in which information regarding an operation according to a unit for performing an operation determined based on type of a hovering input unit.

FIG. 6 is a flowchart for describing a method that the device 100 displays a user interface in which information regarding an operation according to a unit for performing the operation determined based on a type of a hovering input unit is displayed.

In an operation S610, the device 100 may obtain information regarding a type of the hovering input unit 10 that transmits a hovering input to the device 100.

Here, the operation S610 may correspond to the operation S210 described above with reference to FIG. 2.

In an operation S620, the device 100 may determine a unit for performing a selected operation during an execution of an application based on a type of the hovering input unit 10. Here, the unit for performing an operation may be determined based on an amount of information changed as the operation is performed. For example, if the device 100 performs an operation of rewinding a movie, the number of frames skipped per unit of the rewinding operation may be 10% the combined size of all frames or 1% the combined size of all frames.

The selection accuracy of the hovering input unit 10 may be determined based on a type of the hovering input unit 10. The device 100 may determine a unit for performing an operation in correspondence to a selection accuracy of the hovering input unit 10. For example, if a finger with relatively low selection accuracy is a hovering input unit, the device 100 may determine a number of changing frames of a movie to be 10% the combined size of all frames. If a pen with relatively high selection accuracy is a hovering input unit, the device 100 may determine a number of changing frames of a movie to be 1% the combined size of all frames.

In an operation S630, the device 100 may select a user interface in which information regarding an operation based on a determined unit for performing the operation from among a plurality of user interfaces is displayed.

For example, if a movie player application is executed and it is determined that a number of changing frames is 10% the combined size of all frames, the device 100 may select a user interface in which progress bar is divided into sections each equal to 10% the combined size of all frames. If a movie player application is executed and it is determined that a number of changing frames is 1% the combined size of all frames, the device 100 may select a user interface in which a progress bar is divided into sections each equal to 1% the combined size of all frames.

In an operation S640, the device 100 may display a selected user interface. The device 100 may select an operation corresponding to a received hovering input on the displayed user interface.

Here, the operation S640 may correspond to the operation S230 described above with reference to FIG. 2.

Figure 7:
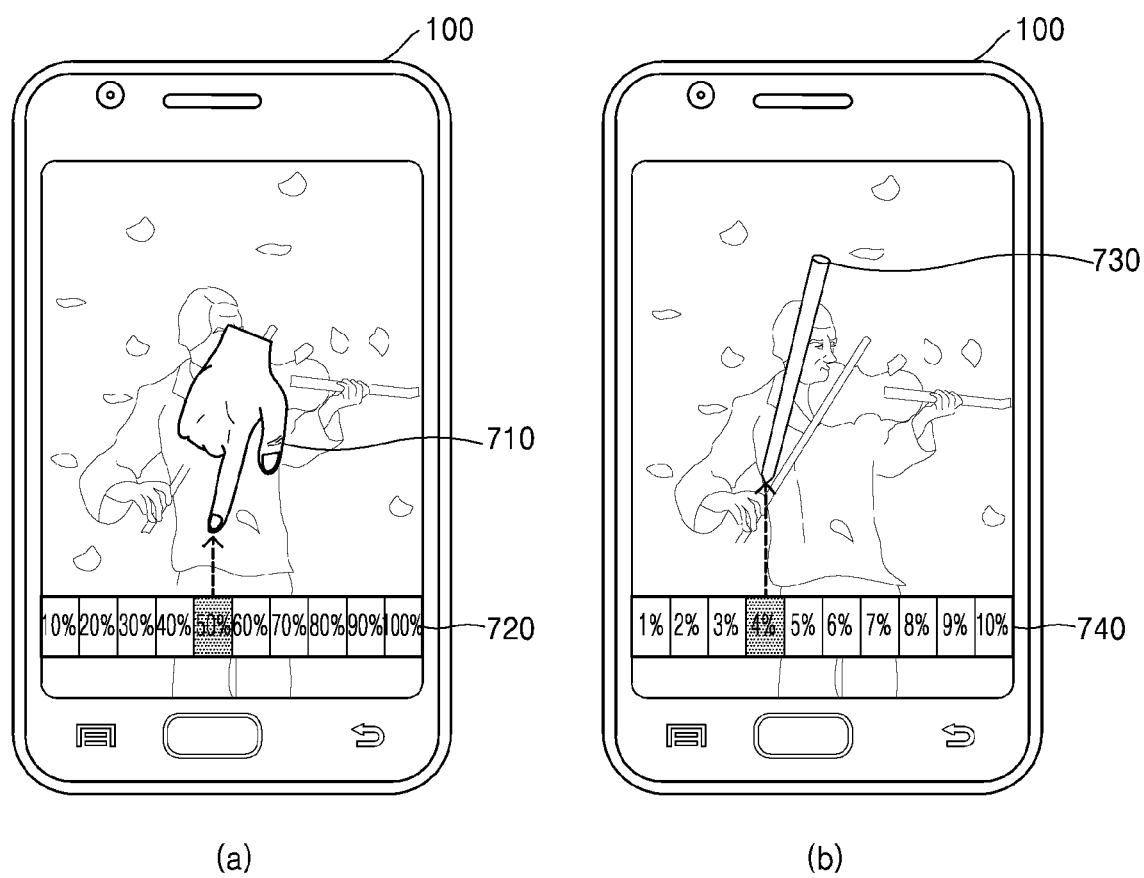
FIG. 7 is a diagram for describing a user interface in which information regarding an operation is displayed based on a type of hovering input unit used for performing the operation during execution of a movie player application, according to an exemplary embodiment.

FIG. 7 is a diagram for describing a user interface in which information regarding an operation selected based on a type of a hovering input unit during an execution of a movie player application is displayed based on a unit for performing the operation, according to an exemplary embodiment.

Referring to (a) of FIG. 7, the device 100 may obtain information regarding a type of a hovering input unit transmitting a hovering input to the device 100. Based on the information regarding the type of the hovering input unit, the device 100 may determine that the hovering input unit is a finger 710.

The device 100 may determine a unit for performing an operation for fast-forwarding a movie corresponding to the finger 710. Here, the unit may be determined based on a number of frames changed as the operation for fast-forwarding a movie is performed.

The device 100 according to an exemplary embodiment may determine a unit for performing an operation for fast-forwarding a movie based on a selection accuracy of the finger 710. If a finger is a hovering input unit, the device 100 may determine information regarding a unit for performing an operation for fast-forwarding a movie based on a database stored in advance. In (a) of FIG. 7, if the finger 710 is a hovering input unit, the device 100 may determine 10% the combined size of all frames as a number of changing frames of a movie.

If it is determined that a number of changing frames of a movie is 10% the combined size of all frames, the device 100 may select a user interface in which a process bar 720 is divided into 10% sections from among a plurality of user interfaces.

The device 100 may display a selected user interface. Furthermore, the device 100 may change a frame being played back to a frame displayed at a location on the user interface corresponding to the finger 710. For example, if a location of the finger 710 corresponds to an image indicating 50%, the device 100 may change a frame being played back to a frame at a location corresponding to 50% the combined size of all frames.

Referring to (b) of FIG. 7, the device 100 may obtain information regarding a type of a hovering input unit transmitting a hovering input to the device 100. Based on the information regarding the type of the hovering input unit, the device 100 may determine that the hovering input unit is a pen 730.

The device 100 may determine a unit for performing an operation for fast-forwarding a movie corresponding to the pen 730. Here, the unit may be determined based on a number of frames changed as the operation for fast-forwarding a movie is performed.

The device 100 according to an exemplary embodiment may determine a unit for performing an operation for fast-forwarding a movie based on a selection accuracy of the pen 730. If a pen is a hovering input unit, the device 100 may determine information regarding a unit for performing an operation for fast-forwarding a movie based on a database stored in advance. In (a) of FIG. 7, if the device 100 determines that the hovering input unit is the pen 730, the device 100 may determine 1% the combined size of all frames as a number of changing frames of a movie.

If it is determined that a number of changing frames of a movie is 1% the combined size of all frames, the device 100 may select a user interface in which a process bar 740 is divided into 1% sections from among a plurality of user interfaces.

The device 100 may display a selected user interface. Furthermore, the device 100 may change a frame being played back to a frame displayed at a location on the user interface corresponding to the pen 730. For example, if a location of the pen 730 corresponds to an image indicating 4%, the device 100 may change a frame being played back to a frame at a location corresponding to 4% the combined size of all frames.

Figure 8A:
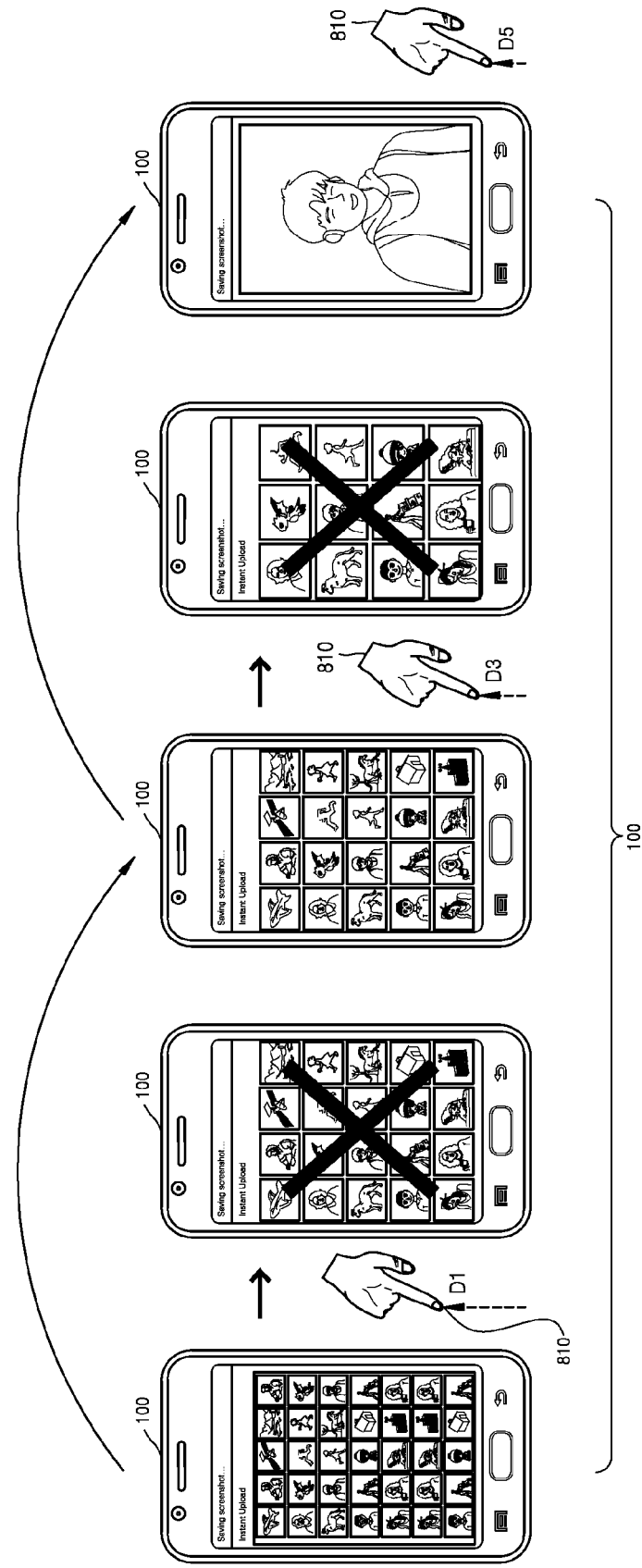
FIGS. 8A and 8B are diagrams for describing user interfaces in which information regarding an operation selected based on type of a hovering input unit during execution of a picture folder application based on a unit for performing the operation, according to an exemplary embodiment.
Figure 8B:
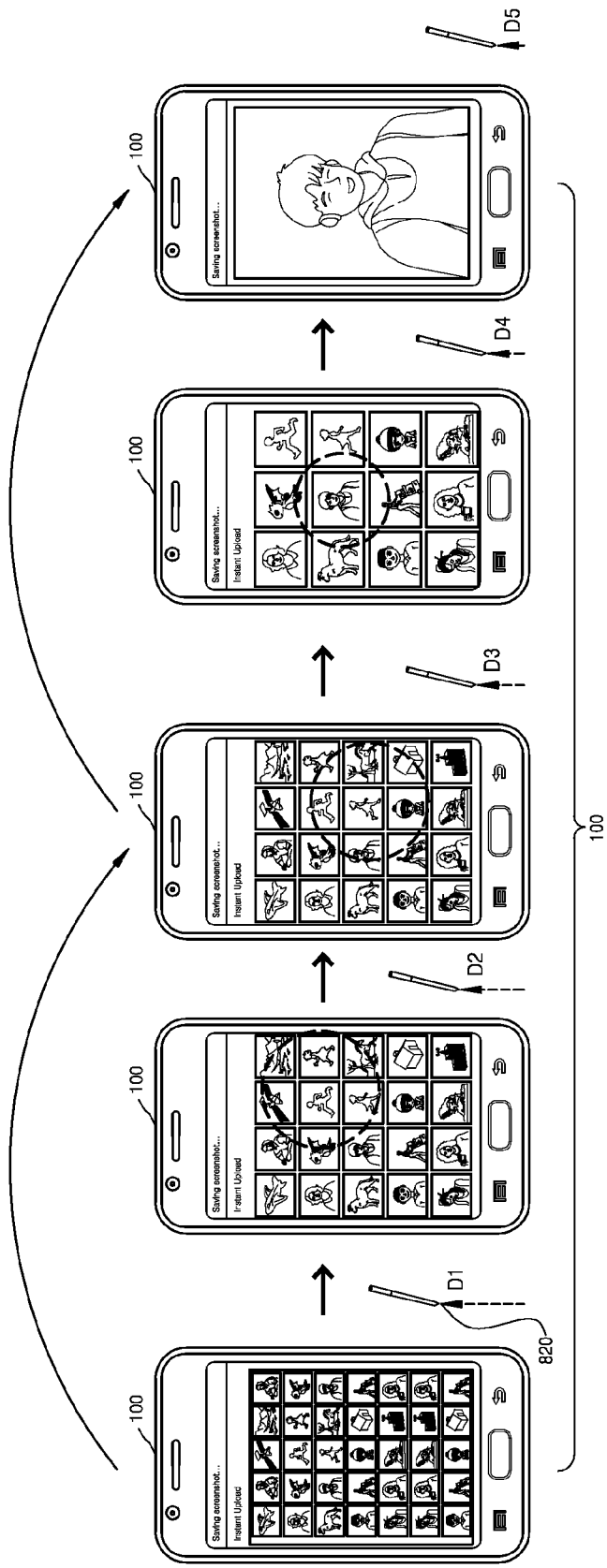

FIGS. 8A and 8B are diagrams for describing user interfaces in which information regarding an operation selected based on a type of a hovering input unit during an execution of a picture folder application based on a unit for performing the operation is displayed, according to an exemplary embodiment.

Referring to FIG. 8A, the device 100 may obtain information regarding a type of a hovering input unit transmitting a hovering input to the device 100. Based on the information regarding the type of the hovering input unit, the device 100 may determine that the hovering input unit is a finger 810.

The device 100 may determine a unit for performing an operation for browsing pictures i corresponding to the finger 810. Here, the unit may be determined based on a number of pictures displayed on a display screen as the operation for browsing pictures is performed.

The device 100 according to an exemplary embodiment may determine a unit for performing an operation for browsing pictures based on a selection accuracy of the finger 810. If a finger is a hovering input unit, the device 100 may determine information regarding a unit for performing an operation for browsing pictures based on a database stored in advance. Based on the selection accuracy of the finger 810, the device 100 may determine 3 units for selecting a number of pictures to be displayed while an operation for browsing pictures is being performed. In FIG. 8A, if a distance between the device 100 and the finger 810 is D1, the device 100 may select a user interface which displays n pictures. If a distance between the device 100 and the finger 810 is D3, the device 100 may select a user interface which displays n/3 pictures. If a distance between the device 100 and the finger 810 is D5, the device 100 may select a user interface which displays n/5 pictures.

Referring to FIG. 8B, the device 100 may obtain information regarding a type of a hovering input unit transmitting a hovering input to the device 100. Based on the information regarding the type of the hovering input unit, the device 100 may determine that the hovering input unit is a pen 820.

The device 100 may determine a unit for performing an operation for browsing pictures corresponding to the pen 820. Here, the unit may be determined based on a number of pictures displayed on a display screen as the operation for browsing pictures is performed.

The device 100 according to an exemplary embodiment may determine a unit for performing an operation for browsing pictures based on a selection accuracy of the pen 820. If the pen 820 is a hovering input unit, the device 100 may determine information regarding a unit for performing an operation for browsing pictures based on a database stored in advance.

Based on a selection accuracy of the pen 820, the device 100 may select 3 pictures to be displayed while an operation for browsing pictures is being performed. In FIG. 8B, if a distance between the device 100 and the pen 820 is D1, the device 100 may select a user interface which displays n pictures. If a distance between the device 100 and the pen 820 is D2, the device 100 may select a user interface which displays n/2 pictures. If a distance between the device 100 and the pen 820 is D3, the device 100 may select a user interface which displays n/3 pictures. If a distance between the device 100 and the pen 820 is D4, the device 100 may select a user interface which displays n/4 pictures. If a distance between the device 100 and the pen 820 is D5, the device 100 may select a user interface which displays n/5 pictures.

FIG. 9 is a diagram for describing a method of changing a user interface based on a hovering input detected by a device 900 including a large display unit, according to an exemplary embodiment.

Referring to (a) of FIG. 9, if a hovering input unit 910 is located at a portion of a large display unit of the device 900 for a predetermined time period or longer, the device 900 may generate a mini-map 920 displaying a portion of a user interface displayed on the large display unit. The device 900 may determine a size of the mini-map 920 based on a distance between a location at which the hovering input unit 910 is located for a predetermined time period or longer and the device 900.

Referring to (b) of FIG. 9, the device 900 may change a portion of a user interface displayed in the mini-map 920 based on a distance between the hovering input unit 910 and the device 900. For example, if a distance between the hovering input unit 910 and the device 900 is D1, the device 900 may display a portion of a user interface, which is 10 cm away from a currently displayed portion of the user interface in an upper-left direction, in the mini-map 920. Furthermore, if a distance between the hovering input unit 910 and the device 900 is D2, the device 900 may display a portion of a user interface, which is 20 cm away from a currently displayed portion of the user interface in an upper-left direction, in the mini-map 920.

Meanwhile, a unit indicating a moving distance of the mini-map 920 may be determined based on a type of the hovering input unit 910. For example, if the hovering input unit 910 is a finger, the device 100 may set a moving distance of the mini-map 920 to 10 cm based on a distance between the finger and the device 900. Meanwhile, if the hovering input unit 910 is a pen, the device 100 may set a moving distance of the mini-map 920 to 5 cm based on a distance between the pen and the device 900.

The device 900 may also determine a moving distance of a mouse pointer or a cursor displayed on a display screen based on a hovering input.

Figure 10:
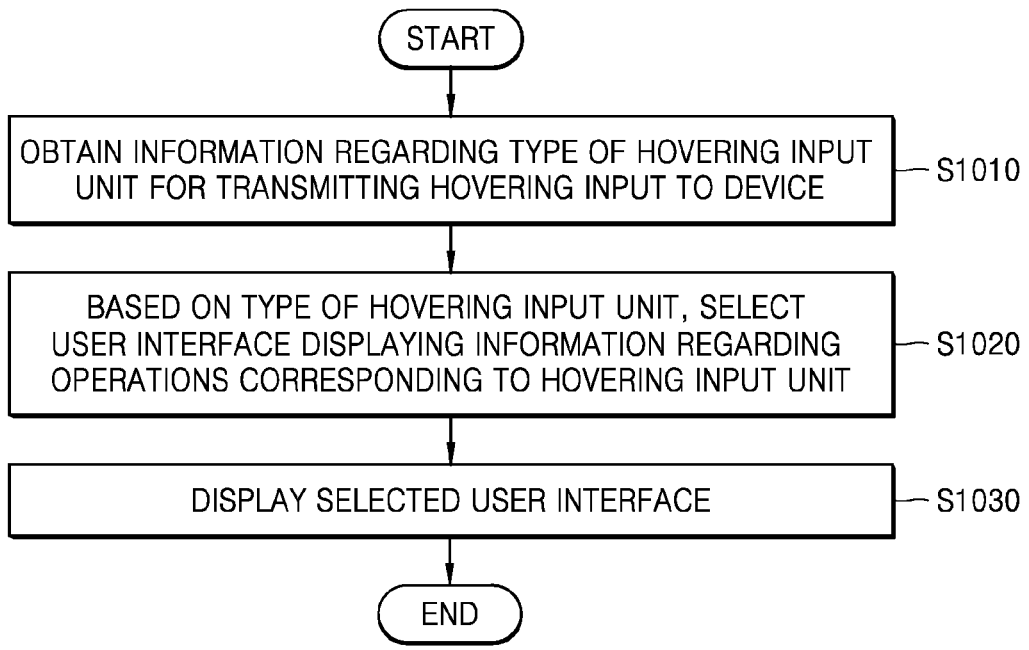
FIG. 10 is a flowchart for describing a method of displaying a user interface in which information regarding operations corresponding to type of a hovering input unit during execution of an application on a device, according to an exemplary embodiment.

FIG. 10 is a flowchart for describing a method of displaying a user interface in which information regarding operations corresponding to a type of a hovering input unit during an execution of an application on the device 100 is displayed, according to an exemplary embodiment.

In an operation S1010, the device 100 may obtain information regarding a type of the hovering input unit 10 transmitting a hovering input to the device 100.

Here, the operation S1010 may correspond to the operation S210 described above with reference to FIG. 2.

In an operation S1020, the device 100 may display a user interface in which information regarding an operation corresponding to a type of a hovering input unit is displayed. Here, an operation corresponding to a type of a hovering input unit may be determined based on whether a hovering input for performing the operation may be transmitted by the hovering input unit.

For example, in the case of performing an operation for writing a text as a memo application is executed on the device 100, it is necessary for a hovering input unit to have high selection accuracy for precisely writing a text. Therefore, an operation for writing a text may correspond to a pen with high selection accuracy. If a pen is detected as a hovering input unit during an execution of a document editing application, the device 100 may select a user interface in which information regarding an operation for writing a text is displayed.

Meanwhile, an operation for selecting one of previously composed documents may be performed even if a selection accuracy of a hovering input unit is low. An operation for selecting one of documents may correspond to a finger with low selection accuracy. If a finger is detected as a hovering input unit during an execution of a document editing application, the device 100 may select a user interface in which information regarding an operation for selecting one of documents is displayed.

In an operation S1030, the device 100 may display a selected user interface. The device 100 may select an operation corresponding to a received hovering input on the displayed user interface.

Here, the operation S1030 may correspond to the operation S230 described above with reference to FIG. 2.

Figure 11:
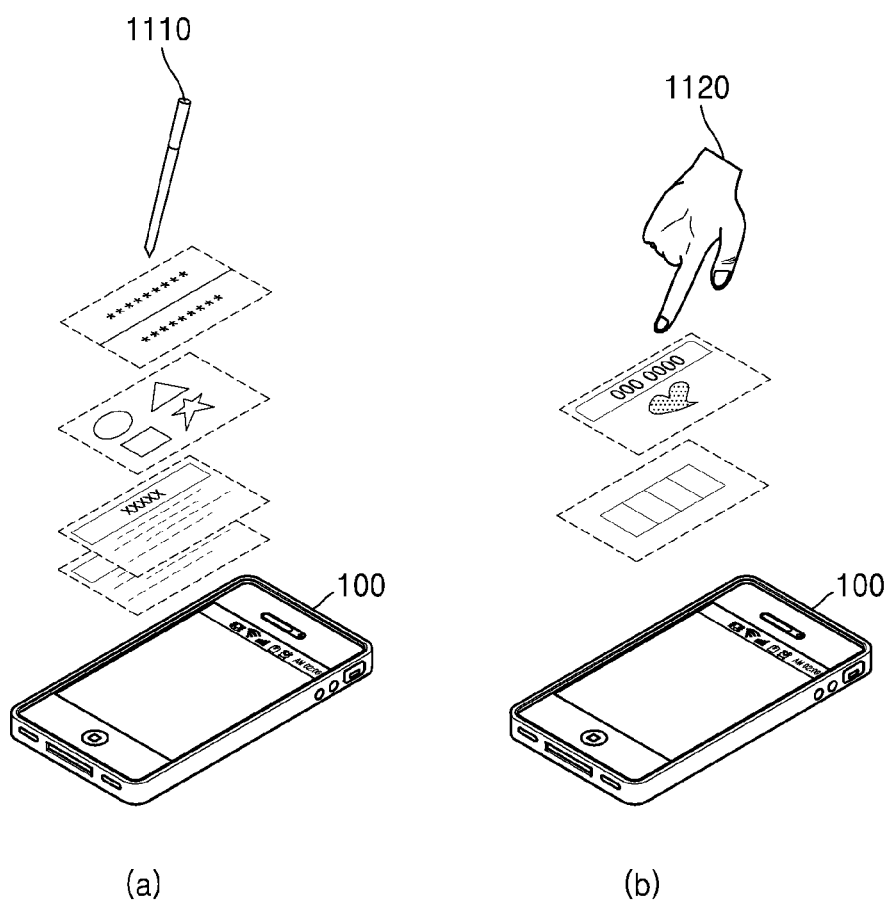
FIG. 11 is a diagram for describing a method that a device selects a user interface based on type of a hovering input unit in the case of executing a document editing application, according to an exemplary embodiment.

FIG. 11 is a diagram for describing a method that the device 100 selects a user interface based on a type of a hovering input unit in the case of executing a document editing application, according to an exemplary embodiment.

Referring to (a) of FIG. 11, the device 100 may obtain information regarding a type of a hovering input unit transmitting a hovering input to the device 100. Based on the information regarding the type of the hovering input unit, the device 100 may determine that the hovering input unit is a pen 1110.

The device 100 according to an exemplary embodiment may display a user interface in which information regarding an operation corresponding to a type of a hovering input unit is displayed. Here, an operation corresponding to a type of a hovering input unit may be determined based on whether a hovering input for performing the operation may be transmitted by the hovering input unit.

For example, operations corresponding to the pen 1110 may include an operation for inputting a mathematical expression, an operation for inputting a text, and an operation for drawing a geometric figure. The above-stated operations are operations that need high selection accuracy, where hovering inputs may be transmitted from the pen 1110, which is a hovering input unit with high selection accuracy, to the device 100.

If the pen 1110 is detected on a display screen of the device 100 according to an exemplary embodiment, the device 100 may display a user interface in which icons respectively indicating an operation for inputting a mathematical expression, an operation for inputting a text, and an operation for drawing a geometric figure are displayed.

Referring to (b) of FIG. 11, the device 100 may obtain information regarding a type of a hovering input unit transmitting a hovering input to the device 100. Based on the information regarding the type of the hovering input unit, the device 100 may determine that the hovering input unit is a finger 1120.

The device 100 according to an exemplary embodiment may display a user interface in which information regarding an operation corresponding to a type of a hovering input unit is displayed. For example, operations corresponding to the finger 1120 may include an operation for selecting one of a plurality of documents and an operation for cancelling execution of inputting a text. The above-stated operations are operations that do not need high selection accuracy, where hovering inputs may be transmitted from the finger 1120, which is a hovering input unit with low selection accuracy, to the device 100.

If the finger 1120 is detected on a display screen of the device 100 according to an exemplary embodiment, the device 100 may display a user interface in which icons respectively indicating an operation for selecting one of a plurality of documents and an operation for cancelling execution of inputting a text are displayed.

Figure 12:
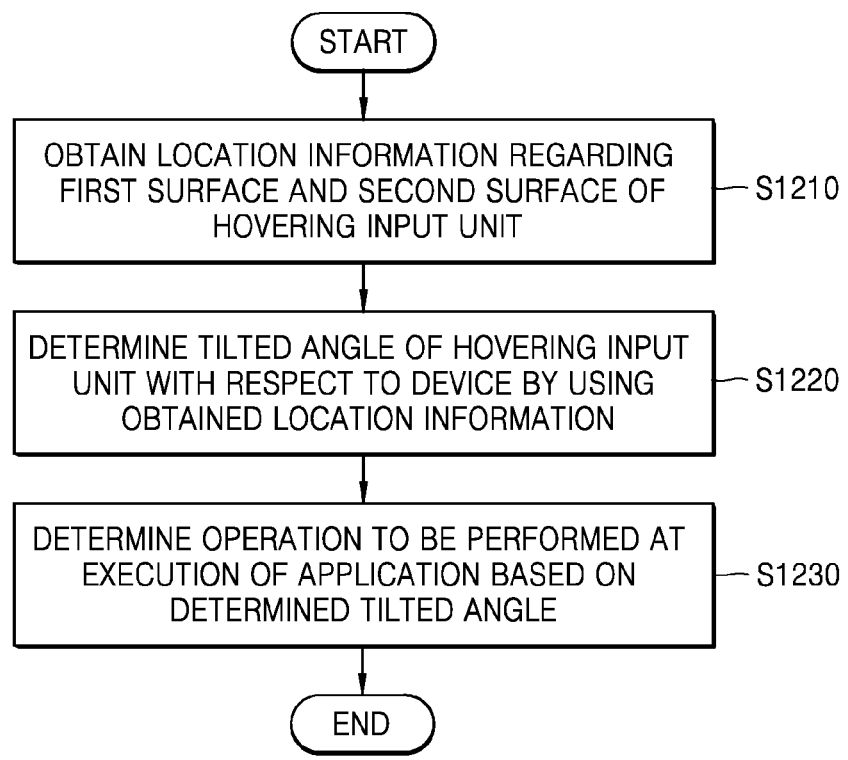
FIG. 12 is a flowchart for describing a method of determining an operation to be performed during execution of an application based on a tilting angle of a hovering input unit with respect to a device, according to an exemplary embodiment.

FIG. 12 is a flowchart for describing a method of determining an operation to be performed during an execution of an application based on a tilting angle of a hovering input unit with respect to the device 100, according to an exemplary embodiment.

In an operation S1210, the device 100 may obtain location information regarding a first surface and a second surface of a hovering input unit. For example, the device 100 may obtain location information regarding the first surface of the hovering input unit closest to the device 100 and a second surface of the hovering input unit farthest from the device 100. In another exemplary example, the device 100 may obtain location information regarding two arbitrary surfaces of a hovering input unit.

In an operation S1220, the device 100 may determine a tilting angle of the hovering input unit with respect to the device 100 by using the obtained location information. For example, the device 100 may determine a tilting angle of a hovering input unit based on an angle between a line interconnecting a first surface and a second surface of the hovering input unit and a display screen of the device 100.

In an operation S1230, the device 100 may determine an operation to be performed during an execution of an application based on the determined tilting angle. For example, in the case of performing an operation for drawing a line in a drawing application, the device 100 may determine a thickness of the line based on a tilting angle of a hovering input unit. In another exemplary example, in the case of performing an operation for drawing a line in a drawing application, the device 100 may determine a color of the line based on a tilting angle of the hovering input unit. Detailed descriptions thereof will be given below with reference to FIG. 13.

FIG. 13 is a diagram for describing a method of determining an operation to be performed during an execution of an application based on a tilting angle of a hovering input unit with respect to the device 100, according to an exemplary embodiment.

Referring to (a) of FIG. 13, the device 100 may obtain location information regarding a first surface and a second surface of a hovering input unit 1310. The device 100 may obtain location information regarding a first surface 1320 of the hovering input unit 1310 closest to the device 100 and a second surface 1330 of the hovering input unit 1310 farthest from the device 100.

The device 100 may determine a tilting angle of a hovering input unit 1310 based on an angle 1340 between a line interconnecting the first surface 1320 and the second surface 1330 of the hovering input unit 1310 and a display screen of the device 100.

Referring to (b) of FIG. 13, the device 100 may determine an operation to be performed during an execution of an application based on the determined tilting angle. In the case of performing an operation for drawing a line in a drawing application, the device 100 may determine a thickness of the line based on a tilting angle of the hovering input unit 1310.

Figure 14:
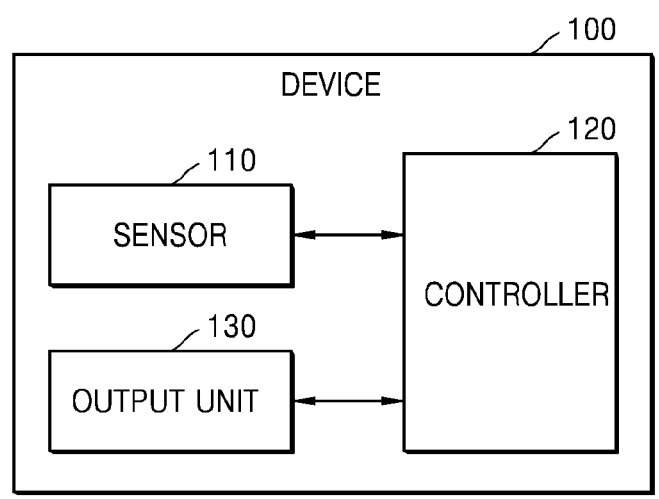
FIGS. 14 and 15 are block diagrams for describing configurations of a device according to an exemplary embodiment.
Figure 15:
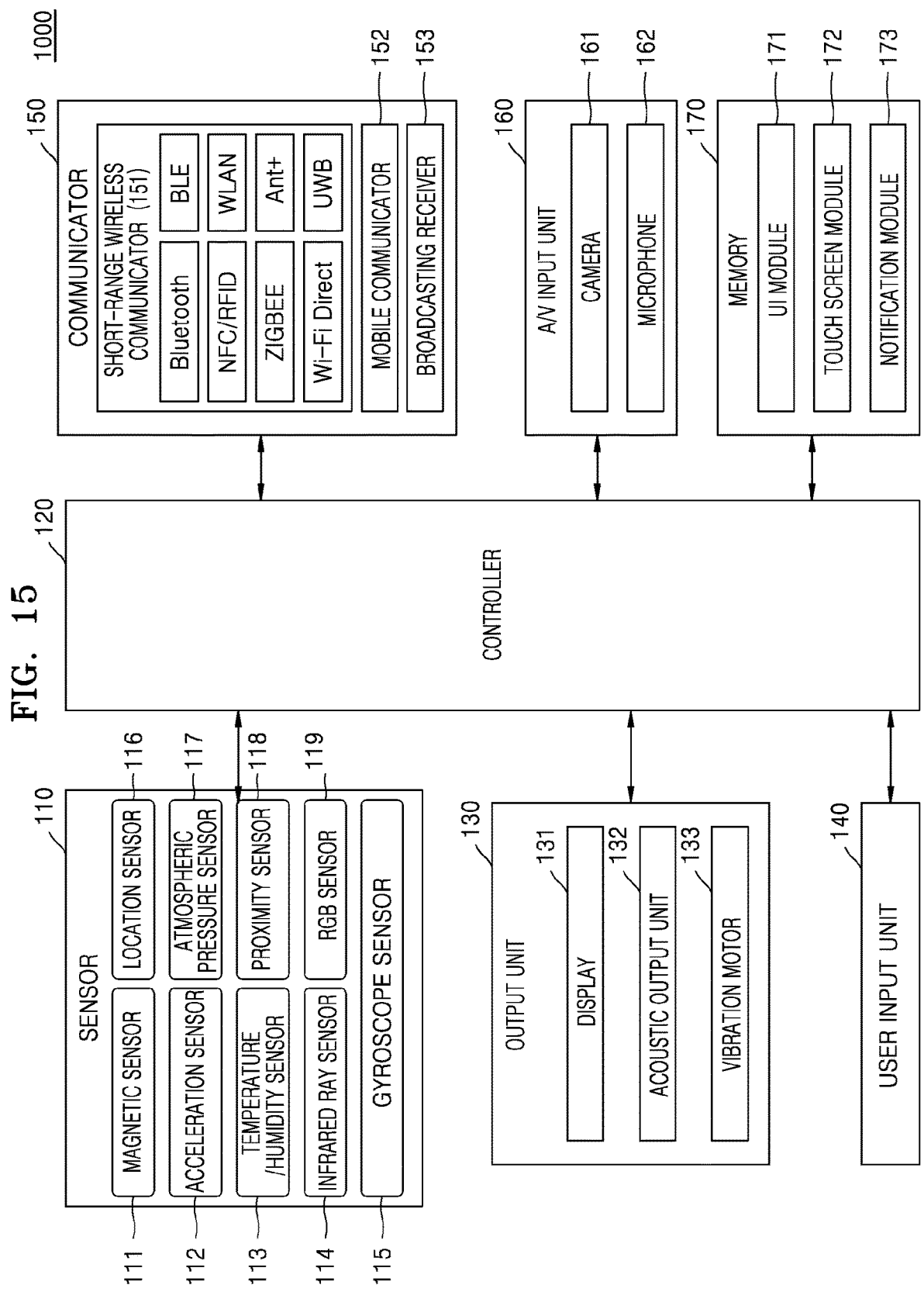

FIGS. 14 and 15 are block diagrams for describing configurations of the device 100 according to an exemplary embodiment.

As shown in FIG. 14, the device 100 according to an exemplary embodiment may include a sensor 110, a controller 120, and an output unit 130. However, not all of the components shown in FIG. 14 are necessary components. The device 100 may be embodied with more or less components than the components shown in FIG. 14.

For example, as shown in FIG. 15, the device 100 may further include a user input unit 140, a communicator 150, an audio/video (A/V) input unit 160, and a memory 170.

Detailed descriptions of the components will be given below.

The sensor 110 may obtain information regarding a type of a hovering input unit that transmits a hovering input to a device. The sensor 110 may also obtain location information regarding a first surface and a second surface of a hovering input unit.

The sensor 110 may include at least one of a magnetic sensor 111, an acceleration sensor 112, a temperature/humidity sensor 113, an infrared ray sensor 114, a gyroscope sensor 115, a location sensor 116, an atmospheric pressure sensor 117, a proximity sensor 118, and an illuminance sensor 119. However, the inventive concept is not limited thereto. Since functions of the above-stated sensors are obvious to one of ordinary skill in the art, detailed descriptions thereof will be omitted.

The controller 120 generally controls the overall operations of the device 100. For example, the controller 120 may control the overall operations of the user input unit 140, the output unit 130, the sensor 110, the communicator 150, and the A/V input unit 160 by executing programs stored in the memory 170.

Based on the obtained information regarding the type of the hovering input unit 10, the controller 120 may select one of a plurality of user interfaces related to an application executed on the device 100.

Based on a type of the hovering input unit 10, the controller 120 may determine a selection accuracy of the hovering input unit 10 indicating a precision of the hovering input unit 10 for recognizing information regarding different operations and transmitting a hovering input to the device 100. Based on the determined selection accuracy, the controller 120 may select a user interface in which information regarding at least one operation performed by an application is displayed.

Furthermore, the controller 120 may select a user interface of which locations for displaying information regarding operations that may be performed during an execution of an application are different according to the determined selection accuracy from among a plurality of user interfaces.

If the determined selection accuracy is equal to or greater than a critical value, the controller 120 may select a user interface in which information regarding operations is displayed based on a distance between the hovering input unit 10 and the device 100.

In another exemplary example, the controller 120 may primarily select a user interface in which information regarding operations corresponding to a type of the hovering input unit 10 is displayed.

The controller 120 may determine a unit for performing a selected operation during an execution of an application based on a type of the hovering input unit 10. The controller 120 may select a user interface in which information regarding an operation is displayed based on the determined unit of performing the operation from among a plurality of user interfaces.

If hovering inputs transmitted from a hovering input unit do not correspond to respective operations that may be performed during an execution of an application, the controller 120 may select a user interface displaying information regarding a plurality of operations that is categorized into groups.

In another exemplary example, the controller 120 may determine a tilting angle of the hovering input unit 10 with respect to the device 100 based on location information obtained by the sensor 110. The controller 120 may determine an operation to be performed during an execution of an application based on the determined tilting angle.

The output unit 130 may display a user interface selected by the controller 120 and may include a display 131, an acoustic output unit 132, and a vibration motor 133.

The display 131 may display information processed by the device 100. For example, the display 131 may display a user interface selected by the controller 120. The display 131 may display a result of performing an operation selected based on a hovering input received by the selected user interface.

Meanwhile, if the display 131 and a touch pad are arranged as layers and constitute a touch screen, the display 131 may be used as an output device, and as an input device. The display 131 may include at least one of a liquid crystal display (LCD), a thin-film transistor (TFT) LCD, an organic light emitting diode (OLED), a flexible display, a 3D display, and an electrophoretic display. Furthermore, according to exemplary embodiments, the device 100 may include two or more displays 131. Here, the two or more displays 131 may be arranged to face each other via a hinge.

The acoustic output unit 132 may output audio data received via the communicator 150 or stored in the memory 170. Furthermore, the acoustic output unit 132 may output acoustic signals related to functions performed by the device 100 (e.g., a call signal reception sound, a message reception sound, a notification sound, etc.). The acoustic output unit 132 may include a speaker or a buzzer.

The vibration motor 133 may output a vibration signal. For example, the vibration motor 133 may output a vibration signal corresponding to output of audio data or video data (e.g., a call signal reception sound, a message reception sound, etc.). Furthermore, the vibration motor 133 may output a vibration signal when a touch is input to a touch screen.

The user input unit 140 refers to a unit configured to input data for controlling the device 100. For example, the user input unit 140 may include a key pad, a dome switch, a touch pad (an electrostatic capacitive type, a resistive type, an IR detecting type, a surface acoustic wave type, an integral tension detection type, a piezoelectric type, etc.), a jog wheel, or a jog switch. However, the inventive concept is not limited thereto.

The communicator 150 may include one or more components enabling communication between the device 100 and an external device or between the device 100 and a server. For example, the communicator 150 may include a short-range wireless communicator 151, a mobile communicator 152, and a broadcasting receiver 153.

The short-range wireless communicator 151 may include a Bluetooth communicator, a Bluetooth Low Energy (BLE) communicator, a near field communication (NFC) unit, a WLAN (Wi-Fi) communicator, a Zigbee communicator, an infrared data association (IrDA) communicator, a Wi-Fi direct (WFD) communicator, a ultra wideband (UWB) communicator, or an Ant+ communicator. However, the inventive concept is not limited thereto.

The mobile communicator 152 may transmit and receive wireless signals to and from at least one of a station, an external terminal, and a server on a mobile communication network. Here, the wireless signals may include voice call signals, video call signals, or various types of data regarding transmission/reception of text/multimedia messages.

The broadcasting receiver 153 may receive broadcasting signals and/or information regarding broadcasting from outside via broadcasting channels. Broadcasting channels may include satellite channels and ground wave channels. According to exemplary embodiments, the device 100 may not include the broadcasting receiver 153.

The communicator 150 may share a result of performing an operation with the external device. Here, the communicator 150 may transmit a result of performing an operation to the external device directly or via the server.

The communicator 150 may receive a result of performing an operation.

The communicator 150 may receive a call request from the external device.

The A/V input unit 160 may input audio signals or video signals and may include a camera 161 and a microphone 162. The camera 161 may obtain an image frame including a still image or a moving picture via an image sensor in a video call mode or an image pickup mode. An image captured by the image sensor is processed by the controller 120 or a separate image processor (not shown).

An image frame processed by the camera 161 may be stored in the memory 170 or transmitted to outside via the communicator 150. According to exemplary embodiments, the device 100 may include two or more cameras 161.

The microphone 162 may receive an external acoustic signal and process the external acoustic signal into digital voice signal. For example, the microphone 162 may receive acoustic signals from an external device or a speaker. The microphone 162 may utilize various noise reduction algorithms to reduce noises during reception of external acoustic signals.

The memory 170 may store programs used by the controller 120 for processing data and controlling components of the device 100 or input/output data (e.g., a plurality of menus, a plurality of first layer sub menus respectively corresponding to the plurality of menus, a plurality of second layer sub menus respectively corresponding to the plurality of first layer sub menus, etc.)

The memory 170 may store a user's biometric information related to at least one of content and the user's content information. The memory 170 may store content summary information.

The memory 170 may include at least one of storage media including a flash memory type storage medium, a multimedia card micro type storage medium, a card type memory (e.g., a SD memory or a XD memory), a random access memory (RAM), a static RAM (SRAM), a read-only memory (ROM), an electrically erasable-programmable ROM (EEPROM), a programmable ROM (PROM), a magnetic memory, a magnetic disk, and an optical disc. Furthermore, the device 100 may utilize a web storage or a cloud server that functions as the memory 170 on the internet.

Programs stored in the memory 170 may be categorized into a plurality of modules, e.g., a UI module 171, a touch screen module 172, a notification module 173, etc.

The UI module 171 may provide a user interface (UI) or a graphical user interface (GUI), which is customized to a particular application and works in conjunction with the device 100. The touch screen module 172 may detect a touch gesture of a user on a touch screen and transmit information regarding the touch gesture to the control unit 120. The touch screen module 172 according to an exemplary embodiment may recognize and analyze a touch code. The touch screen module 172 may also be embodied as a separate hardware unit including a controller.

Various sensors may be arranged inside or nearby a touch screen to detect a touch or a proximity touch on the touch screen. An example of sensors for detecting a touch on a touch screen may be a tactile sensor. A tactile sensor refers to a sensor for detecting contact of a particular object having sensitivity greater than or equal to the sense of touch. A tactile sensor may detect various information, such as a roughness of a contact surface, a hardness of a contacting object, a temperature at a contact point, etc.

Furthermore, another example of sensors for detecting a touch on a touch screen may be a proximity sensor.

A proximity sensor refers to a sensor that detects existence of an object approaching to a designated detection surface or a nearby object using electromagnetic force or an infrared ray (IR) without a mechanical contact. Examples of proximity sensors may include a transmissive photoelectric sensor, a direct-reflection type photoelectric sensor, a mirror-reflection type photoelectric sensor, a high-frequency wave emission type proximity sensor, an electrostatic capacitance type proximity sensor, a magnetic type proximity sensor, and an IR proximity sensor. Touch gestures of a user may include a tapping, a touch & hold, double tapping, a dragging, a panning, a flicking, a drag-and-drop, and a swiping.

The notification module 173 may generate a signal for notifying an event occurring at the device 100. Examples of events occurring at the device 100 may include reception of a call signal, reception of a message, input of a key signal, notification of a schedule, and acquisition of a user input. The notification module 173 may output notification signals in the form of video signals via the display unit 131, in the form of audio signals via the acoustic output unit 132, or in the form of vibration signals via the vibration motor 133.

While not restricted thereto, an exemplary embodiment may be implemented as computer instructions which can be executed by various computer means, and recorded on a non-transitory computer-readable recording medium. The non-transitory computer-readable recording medium may include program commands, data files, data structures or a combination thereof. Program instructions recorded on the medium may be particularly designed and structured for the inventive concept or available to those skilled in computer software. Examples of the non-transitory computer-readable recording medium may include magnetic media, such as a hard disk, a floppy disk, and a magnetic tape; optical media, such as a compact disk-read only memory (CD-ROM) and a digital versatile disc (DVD); magneto-optical media, such as floptical disks; a read-only memory (ROM); a random access memory (RAM); and a flash memory. The non-transitory computer-readable recording medium may be a transmission medium, such as an optical or metal line, a waveguide, or carrier waves transferring program commands, data structures, and the like. Program commands may include, for example, a high-level language code that can be executed by a computer using an interpreter, as well as a machine language code made by a compiler. Moreover, one or more components or elements of the above-described apparatuses may include a processor or microprocessor executing a computer program stored in a computer-readable medium.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the appended claims.

What is claimed is:

1. A method of controlling a device, the method comprising:
    obtaining information regarding a type of a hovering input unit configured to transmit a hovering input to the device in which an application is executed, wherein the application includes at least one application from among an image player application and a video player application;
    if a selection accuracy is equal to or greater than a predetermined value, selecting a user interface displaying information regarding one of separate operations based on a distance between the hovering input unit and the device among a plurality of user interfaces, wherein the plurality of user interfaces are distinguished based on the separate operations related to the application, and wherein each user interface of the plurality of user interfaces displays information regarding a corresponding operation among the separate operations, and a user interface selected from the plurality of user interfaces is displayed according to a change of the distance between the hovering input unit and the device;
    if the selection accuracy is lower than the predetermined value, selecting a user interface displaying information regarding a group of operations among groups which the separate operations classified into among a plurality of user interface, wherein each of the groups is identified based on the distance between the hovering input unit and the device, and the operations in the group are identified based on a 2-dimensional position of the hovering input unit; and
    displaying the selected user interface.

2. The method of claim 1,
    wherein a number of images being processed in response to the hovering input unit being at a first distance away from the device is different from a number of images being processed in response to the hovering input unit being at a second distance away from the device, and
    wherein the second distance is different from the first distance.

3. The method of claim 1, further comprising:
    displaying information regarding operations corresponding to the type of the hovering input unit, in response to executing the application.

4. The method of claim 1, wherein the displaying the selected user interface comprises, if hovering inputs do not correspond to respective operations to be performed during an execution of the application, displaying a user interface displaying information regarding a plurality of operations classified into the groups.

5. The method of claim 4, wherein the plurality of operations are classified into groups based on at least one of a number of times that each of the respective operations is performed during a preset time period and relationships between the operations.

6. The method of claim 1, further comprising:
    obtaining location information regarding a first surface and a second surface of the hovering input unit;
    determining an angle between the hovering input unit and the device by using the obtained location information; and
    determining an operation to be performed during an execution of the application based on the determined angle.

7. A device comprising:
    a sensor configured to obtain information regarding a type of a hovering input unit transmitting a hovering input to the device in which an application is executed, wherein the application includes at least one application from among an image player application and a video player application;
    a controller configured to:
    if a selection accuracy is equal to or greater than a predetermined value, select a user interface displaying information regarding one of separate operations based on a distance between the hovering input unit and the device among a plurality of user interfaces, wherein the plurality of user interfaces are distinguished based on the separate operations related to the application, and wherein each user interface of the plurality of user interfaces displays information regarding a corresponding operation among the separate operations, and a user interface selected from the plurality of user interfaces is displayed according to a change of the distance between the hovering input unit and the device, and
    if the selection accuracy is lower than the predetermined value, select a user interface displaying information regarding a group of operations among groups which the separate operations classified into among a plurality of user interfaces, wherein each of the groups is identified based on the distance between the hovering input unit and the device, and the operations in the group are identified based on a 2-dimensional position of the hovering input unit; and
    a display configured to display the selected user interface.

8. The device of claim 7, wherein a number of images being processed in response to the hovering input unit being at a first distance away from the device is different from a number of images being processed in response to the hovering input unit being at a second distance away from the device, and
    wherein the second distance is different from the first distance.

9. The device of claim 7, wherein, the display is configured to display information regarding operations corresponding to the type of the hovering input unit in response to executing the application.

10. The device of claim 7, wherein, if hovering inputs do not correspond to respective operations to be performed during an execution of the application, the controller configured to select a user interface displaying information regarding a plurality of operations that are classified into the groups.

11. The device of claim 10, wherein the plurality of operations are classified into groups based on at least one of numbers of times that the respective operations are performed during a preset time period and relationships between the operations.

12. The device of claim 7, wherein the sensor is configured to obtain location information regarding a first surface and a second surface of the hovering input unit, and the controller configured to determine an angle between the hovering input unit and the device by using the obtained location information and determine an operation to be performed during an execution of the application based on the determined angle.

13. A non-transitory computer readable recording medium having recorded thereon a computer program, which, when executed by a computer, performs the method of claim 1.

14. The method of claim 1, wherein the selection accuracy at least in part represents a spatial distance between information arranged on the plurality of user interfaces.

15. The method of claim 14, wherein the information arranged on the plurality of user interfaces comprises selection items and information items which are spaced apart on the plurality of user interfaces at different distances depending on the selection accuracy.

16. The method of claim 1, wherein the type of the hovering input unit is one of different types of hovering input units which comprise a first type having a first selection accuracy and a second type having a second selection accuracy less than the first selection accuracy.

17. The method of claim 1, further comprising determining a unit for performing an operation from among the separate operations, based on an amount of information being changed according to various positions of the hovering input unit.

* * * * *